US012674564B2

(12) United States Patent
Commerford

(10) Patent No.: US 12,674,564 B2
(45) Date of Patent: Jul. 7, 2026

(54) BEZEL FOR A LIGHT SOURCE

(71) Applicant: Peter Commerford, Londonderry, NH (US)

(72) Inventor: Peter Commerford, Londonderry, NH (US)

(73) Assignee: Animated LED Lighting, LLC, Londonderry, NH (US)

( * ) Notice: Subject to any disclaimer, the term of this patent is extended or adjusted under 35 U.S.C. 154(b) by 0 days.

(21) Appl. No.: 19/289,881

(22) Filed: Aug. 4, 2025

(65) Prior Publication Data

US 2026/0043535 A1 Feb. 12, 2026

Related U.S. Application Data

(60) Provisional application No. 63/681,742, filed on Aug. 9, 2024.

(51) Int. Cl.

| | |
|---|---|
| ***F21V 21/02*** | (2006.01) |
| ***F21S 8/06*** | (2006.01) |
| ***F21V 3/06*** | (2018.01) |
| ***F21V 21/08*** | (2006.01) |
| ***F21V 21/096*** | (2006.01) |
| *F21S 4/28* | (2016.01) |

(52) U.S. Cl.

CPC ............ *F21V 21/025* (2013.01); *F21S 8/066* (2013.01); *F21V 3/0625* (2018.02); *F21V 21/0808* (2013.01); *F21V 21/0832* (2013.01); *F21V 21/096* (2013.01); *F21S 4/28* (2016.01)

(58) Field of Classification Search

CPC ............................ F21V 21/025; F21V 21/096

See application file for complete search history.

(56) References Cited

U.S. PATENT DOCUMENTS

| | | | | |
|---|---|---|---|---|
| 2003/0081419 | A1* | 5/2003 | Jacob | F21V 29/85 362/364 |
| 2003/0103347 | A1* | 6/2003 | Friend | F21V 21/002 362/225 |
| 2012/0092875 | A1* | 4/2012 | Cho | F21S 4/28 362/362 |
| 2014/0126199 | A1* | 5/2014 | Heeter | F21V 21/096 362/396 |
| 2016/0091185 | A1* | 3/2016 | Soderholm | F21S 2/00 362/11 |
| 2020/0256547 | A1* | 8/2020 | Brown | G02B 6/001 |
| 2023/0366529 | A1* | 11/2023 | Zhao | H01R 25/142 |

* cited by examiner

*Primary Examiner* — Eric T Eide

(74) *Attorney, Agent, or Firm* — Maine Cernota & Curran

(57) ABSTRACT

A bezel (or other article) for a light source includes a cutout portion to allow the bezel to ride up and over any cross braces in the suspended ceiling. The bezel design can be comprised of a variety of materials, as will be appreciated in light of the present disclosure, and in a variety of shape configurations, to generally provides for diffusing (or otherwise manipulating) light emanating from a light source (such as an LED (light emitting diode) strip) secured to the ceiling braces. The bezel includes a first arm, a second arm, and a third arm connected between the first and second arm. The first arm includes a first securing means for releasably fastening the first arm to the bracket. The second arm includes a second securing means for releasably fastening the second arm to the bracket.

18 Claims, 16 Drawing Sheets

BEZEL FOR A LIGHT SOURCE

RELATED APPLICATIONS

This application claims the benefit of U.S. Provisional Patent No. 63/681,742, filed Aug. 9, 2024. This application is herein incorporated by reference, in its entirety, for all purposes.

FIELD OF THE DISCLOSURE

The present disclosure relates generally to optical components used in architectural lighting, and more particularly to diffusers configured to distribute light from sources such as LEDs in dropped-ceiling environments.

BACKGROUND OF THE DISCLOSURE

Dropped-ceiling systems commonly employ a network of brackets to support ceiling panels, fixtures, and accessories. In some configurations, these brackets are integrated with or adapted to support LED lighting components. While LED lighting offers numerous advantages in such installations, including efficiency and compactness, it often produces harsh or uneven illumination if left undiffused. To address this, various solutions have been proposed to diffuse the light emitted by the LEDs. However, many of these approaches involve complex assemblies or additional hardware that must be mounted onto the bracket structure, adding bulk, increasing installation time, and raising costs.

What is needed, therefore, is a simplified and effective lighting diffuser solution for use in dropped-ceiling environments, one that minimizes additional components, reduces installation complexity, and provides uniform light diffusion without compromising the structural or aesthetic integrity of the ceiling system.

SUMMARY OF THE DISCLOSURE

The present disclosure provides a light-diffusing solution for use with dropped-ceiling systems, particularly in conjunction with LED-based lighting. In various embodiments, a diffuser is configured to interface with ceiling brackets or support structures in a manner that is structurally simple, aesthetically clean, and easy to install. The disclosed diffusers reduce glare and provide uniform light distribution without requiring complex mounting hardware or substantial modification to existing ceiling components. Additional embodiments may include integrated or retrofittable designs, enabling compatibility with a range of lighting and ceiling configurations.

In one embodiment, an article for a light source is connected to a bracket for a suspended ceiling comprising a first arm having a first securing means for releasably fastening the first arm to the bracket, the first securing means being on a proximal end of the first arm; a second arm having a second securing means for releasably fastening the second arm to the bracket, the second securing means on a proximal end of the second arm; and a third segment connected between distal ends of the first and second arm. In the article, a gap of at least ½-inch is formed between the third segment and the bracket when the article is installed on the bracket.

In some embodiments, the article comprises a diffuser for the light source to diffuse a predetermined amount of light.

In some embodiments, the securing means comprise a snap-fit groove.

In some embodiments, the securing means comprises magnets.

In some embodiments, the securing means comprises an adhesive strip.

In some embodiments, the adhesive strip is comprised of a permanent adhesive.

In some embodiments, the adhesive strip is comprised of a removable adhesive.

In some embodiments, the securing means comprises a hook-and-loop fastener.

In some embodiments, the bezel is comprised of a translucent material.

In some embodiments, the bezel is comprised of a clear plastic material.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

The following detailed description is intended to provide illustrative examples of various embodiments of the disclosed diffuser systems and related components. It is understood that the scope of the disclosure is not limited to the specific configurations described herein, but rather includes modifications and equivalents that would be apparent to those of ordinary skill in the art. In the embodiments described, various structural and functional features are provided for diffusing light from a light source, such as an LED, within a dropped-ceiling environment. The components may be integrally formed with, or removably attachable to, ceiling brackets or other support structures, and may include features for tool-free installation, improved optical performance, and compatibility with standard ceiling hardware.

In accordance with embodiments of the present disclosure, a bezel, or similar article, for a light source is configured for attachment to a bracket, such as a bracket used in a dropped-ceiling system. In certain embodiments, the bezel includes one or more cutouts 310 that enable it to fit over or around cross braces in a ceiling grid, facilitating seamless integration with existing ceiling structures. The cutouts 310 may be incorporated during the manufacturing process or introduced by an installer to tailor the fit to specific requirements.

The bezel may be fabricated from a range of materials and manufactured in various geometries, as will be appreciated in light of the present disclosure. In general, the bezel is designed to diffuse or otherwise condition the light emitted from a light source, such as an LED strip, mounted on or adjacent to the ceiling bracket. In some embodiments, the bezel may manipulate the light in additional ways, such as aiming, dimming, redirecting, and/or softening the illumination to achieve a desired lighting effect.

The bezel may include a first arm, a second arm, and a third arm extending between and connecting the first and second arms. The first arm may include a first securing feature positioned at its proximal end, the first securing feature configured to releasably attach the first arm to a brace or bracket. Similarly, the second arm may include a second securing feature at its proximal end that provides for releasable attachment to the brace or bracket.

When installed, the third arm of embodiments spans between the first and second arms and is positioned such that a gap, in embodiments of at least approximately ½ inch, is formed between the third arm and the bracket. This offset spacing facilitates light diffusion and accommodates a wide variety of ceiling hardware, among other benefits.

Figure 1:
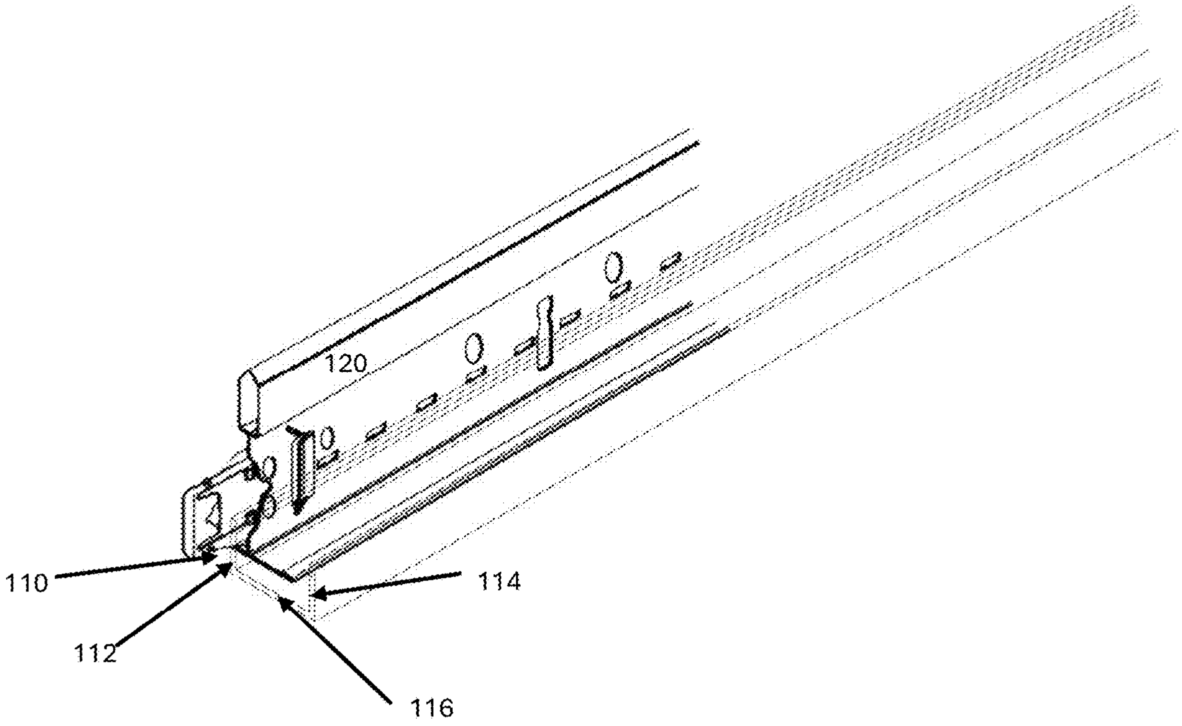
FIG. 1 is a perspective view of a square-faced bezel, shown in the engaged position with respect to a bracket, according to embodiments of the present disclosure.

Now with reference to the Figures, FIG. 1 provides a perspective view of a square-faced bezel 110, shown in the engaged position with respect to a bracket 120 of a dropped-ceiling structure, in accordance with embodiments of the present disclosure. The bezel 110 may also be referred to herein as an article having a first arm 112, a second arm 114, and a third segment 116 positioned between the first arm 112 and the second arm 114. The square-faced bezel 110 is shown in greater detail in FIGS. 2-6.

Figure 2:
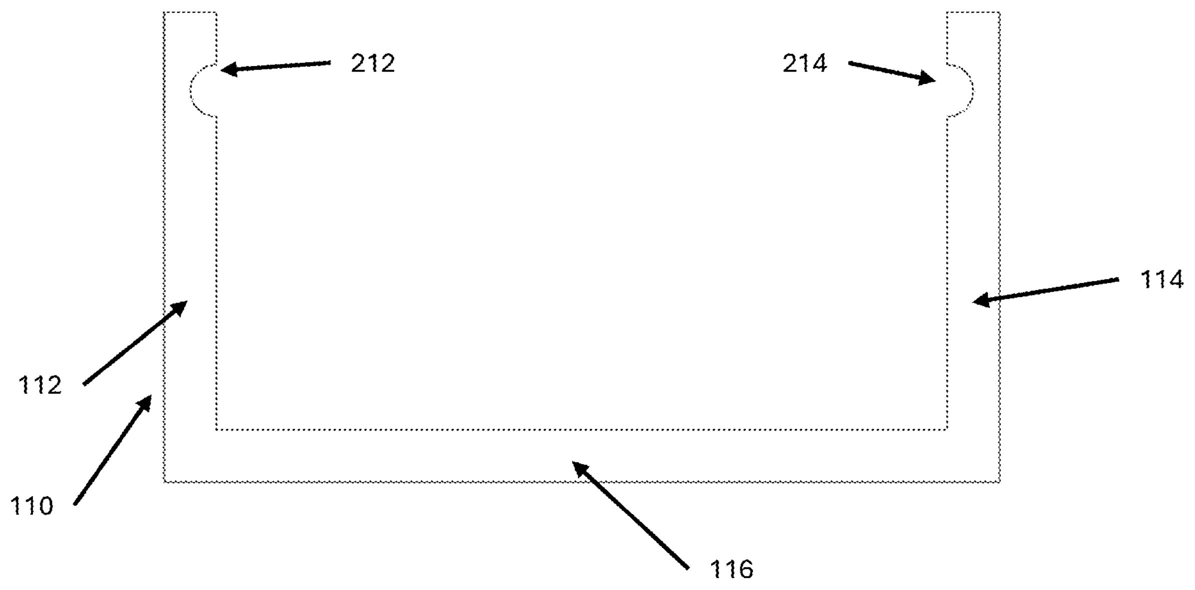
FIG. 2 is a first end view of the square-faced bezel, according to embodiments of the present disclosure.

FIG. 2 is a first end view of the square-faced bezel 110, according to embodiments of the present disclosure. The inner surface of the first arm 112 and the second arm 114 each include a groove, groove 212 and groove 214, respectively.

The first arm 112, in embodiments, has a height of approximately 9⁄16-inch, and the groove 212 has a diameter of approximately 1⁄16-inch and a depth of approximately 1⁄32-inch.

The arm 112, second arm 114, and segment 116 may each have a thickness of approximately 1⁄16-inch, in embodiments.

In embodiments, the thickness may vary in the segment 116 with respect to the arm 112 and second arm 114, depending upon the aesthetic or desired functionality/compatibility of the bezel. For example, the thickness of the segment 116 may be greater or less than the thickness of the arm 112 and second arm 114 or all three may be approximately the same thickness.

Figure 3:
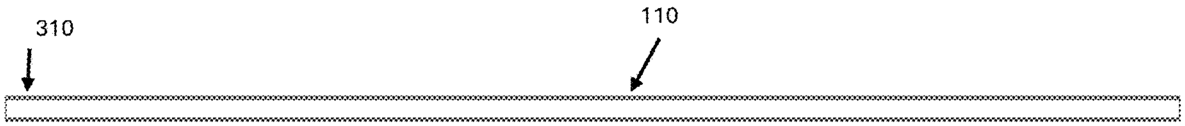
FIG. 3 is a first side view of the square-faced bezel, according to embodiments of the present disclosure.

FIG. 3 is a first side view of the square-faced bezel 110, according to the present disclosure. The cutout 310 provides clearance for cross-braces in any brackets and is shown in greater detail in FIGS. 4-6. The clearance provided by the cutout 310 allows the bezel to ride up and over any cross braces.

Figure 4:
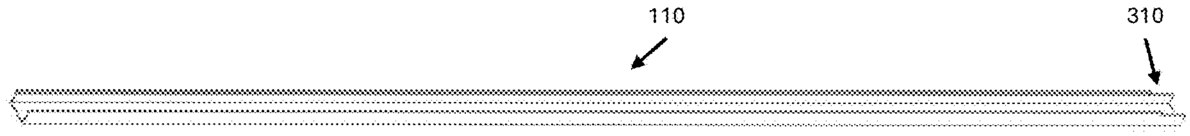
FIG. 4 is a top, perspective view of the square-faced bezel, according to embodiments of the present disclosure.
Figure 5:
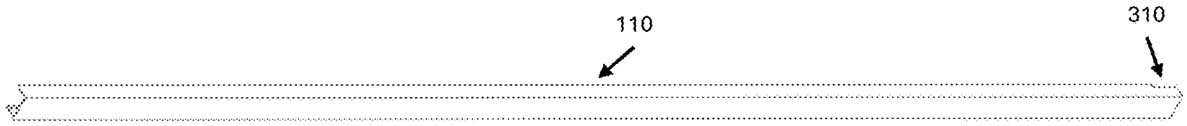
FIG. 5 is a bottom, perspective view of the square-faced bezel, according to embodiments of the present disclosure.
Figure 6:
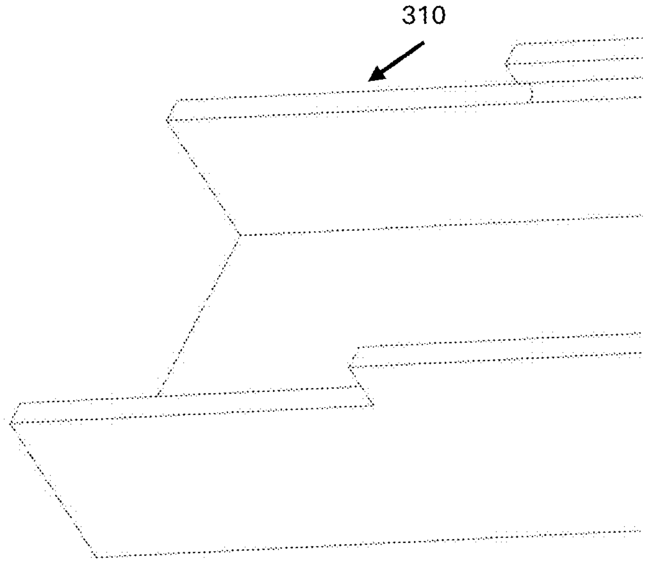
FIG. 6 is top, perspective, detail view of a cutout of the square-faced bezel, according to embodiments of the present disclosure.

FIG. 4 is a top, perspective view of the square-faced bezel 110, FIG. 5 is a bottom, perspective view of the square-faced bezel 110, and FIG. 6 is top, perspective, detail view of the cutout 310 of the square-faced bezel 110, all according to embodiments of the present disclosure and better showing details of the cutout 310, which, in embodiments, has a height of approximately ⅛-inch and a width of approximately 1-inch.

The square-faced bezel 110 of FIGS. 1-6 is, of course, generally square-shaped, having approximated 90-degree corners on its front face, between the segment 116 and each of the arm 112 and second arm 114, however, it will be appreciated that the bezel can have a variety of shapes, including those that will be shown and described below, so long as the bezel includes grooves for clipping the bezel onto a brace or bracket (or otherwise securing the bezel thereto).

Alternative bezel embodiments are shown in FIGS. 7-16. More specifically, a round-faced bezel 700 is depicted in FIGS. 7-11 and a chamfer-faced bezel 1200 is depicted in FIGS. 12-16. Additional variations and modifications will be appreciated in light of the present disclosure.

Figure 7:
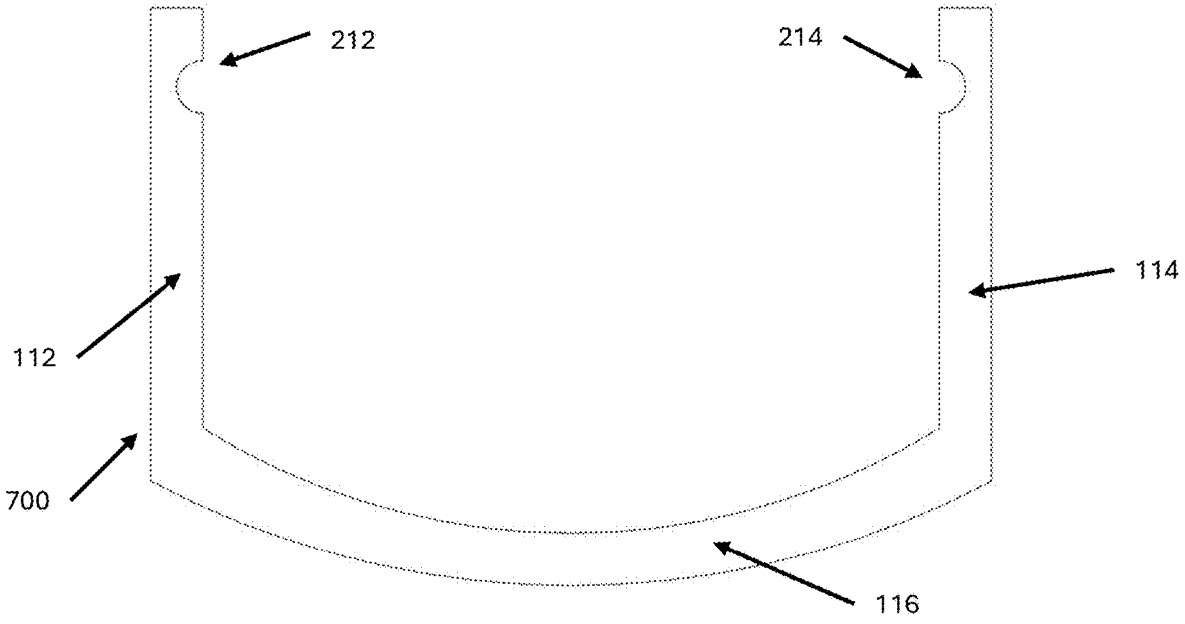
FIG. 7 is a first end view of a round-faced bezel, according to embodiments of the present disclosure.
Figure 8:
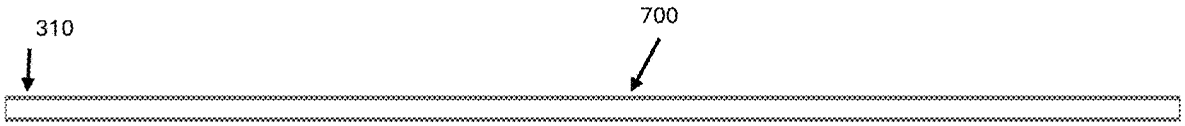
FIG. 8 is a first side view of the round-faced bezel, according to embodiments of the present disclosure.

Reference is now made to FIG. 7, which illustrates a first end view of a round-faced bezel 700, according to the present disclosure. FIG. 8 is a first side view of the round-faced bezel 700.

Figure 9:
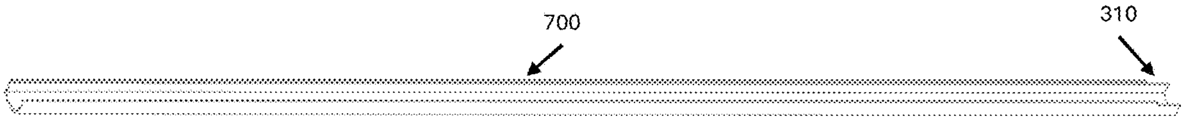
FIG. 9 is a top, perspective view of the round-faced bezel, according to embodiments of the present disclosure.
Figure 10:
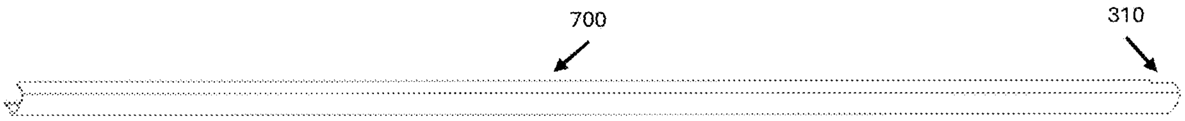
FIG. 10 is a bottom, perspective view of the round-faced bezel, according to embodiments of the present disclosure.
Figure 11:
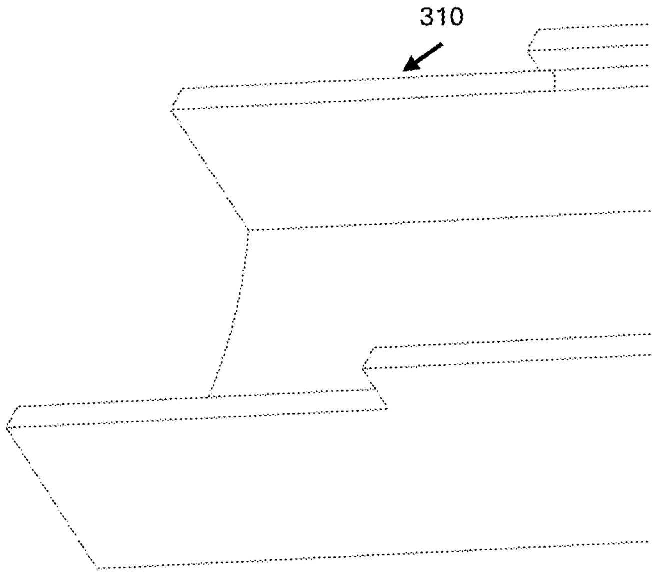
FIG. 11 is top, perspective, detail view of a cutout of the round-faced bezel, according to embodiments of the present disclosure.

FIG. 9 is a top, perspective view of the round-faced bezel 700, FIG. 10 is a bottom, perspective view of the round-faced bezel 700, and FIG. 11 is top, perspective, detail view of the cutout 310 of the round-faced bezel 700 better showing details of the cutout 310, all according to embodiments of the present disclosure.

Figure 12:
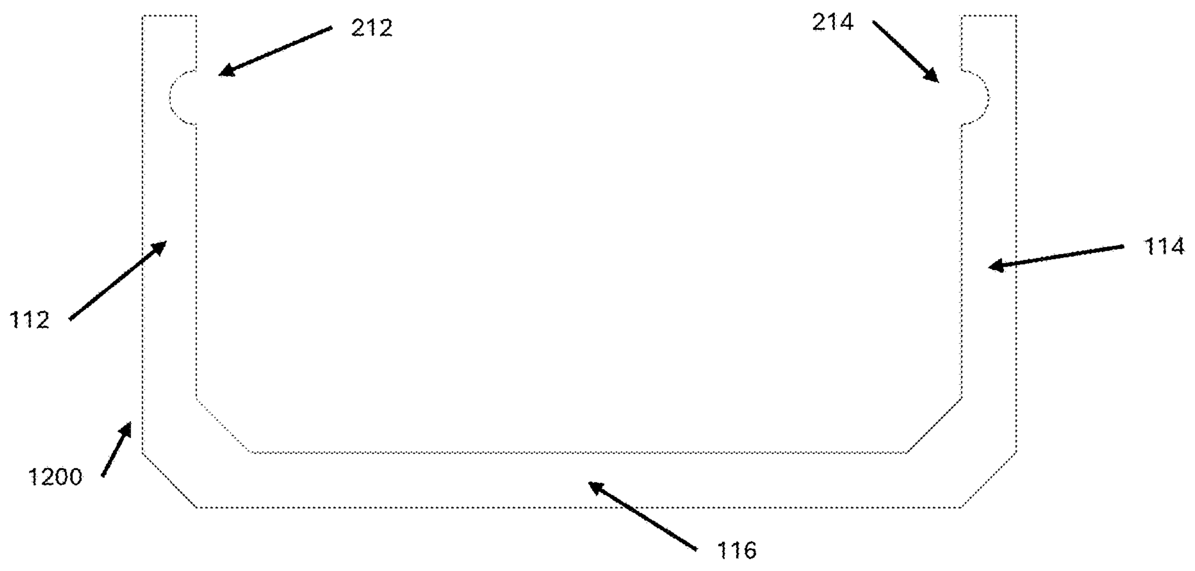
FIG. 12 is a first end view of a chamfer-faced bezel, according to embodiments of the present disclosure.
Figure 13:
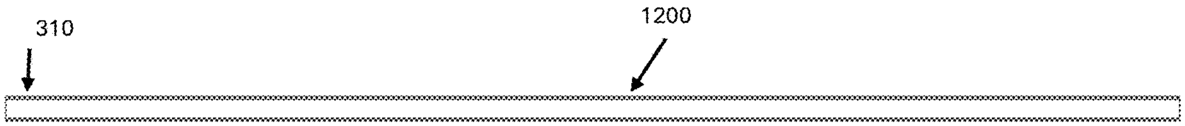
FIG. 13 is a first side view of the chamfer-faced bezel, according to embodiments of the present disclosure.
Figure 14:
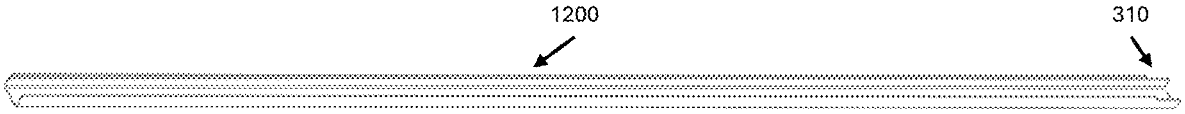
FIG. 14 is a top, perspective view of the chamfer-faced bezel, according to embodiments of the present disclosure.
Figure 15:
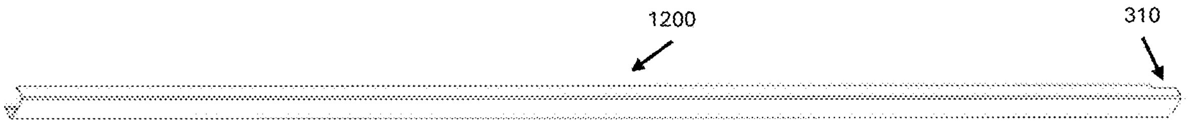
FIG. 15 is a bottom, perspective view of the chamfer-faced bezel, according to embodiments of the present disclosure.
Figure 16:
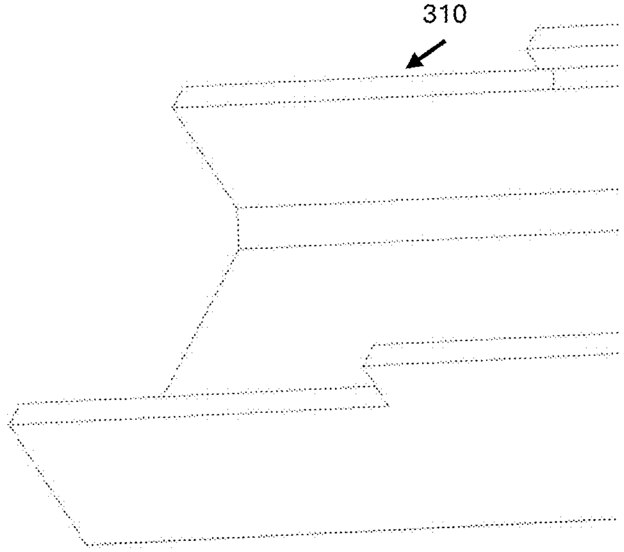
FIG. 16 is top, perspective, detail view of a cutout of a chamfer-faced bezel, according to embodiments of the present disclosure.

Reference is now made to FIG. 12, which illustrates a first end view of a chamfer-faced bezel 1200, according to the present disclosure. FIG. 8 is a first side view of the chamfer-faced bezel 1200.

The bezel may, in embodiments, be about 1-inch wide between exterior surfaces and about ⅞-inch wide between interior surfaces.

The bezels may be constructed and arranged to engage with a ceiling track having a built-in channel. The bracket may include a built-in channel configured to receive an LED strip or other light source. The bezel may include protrusions that engage with grooves on the bracket.

Note that although the term bezel is used, this can be interchangeably used with article, or diffuser, herein. It will be appreciated that a bezel is broader in that it could be clear plastic, in which case the article would not diffuse any light, or could be any translucent material that hides or obscures an LED strip or other light source while allowing the light to shine through.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An article for a light source connectable to a bracket for a suspended ceiling, the article comprising:

a first arm having a first securing means for releasably fastening the first arm to the bracket, the first securing means being on or near a proximal end of the first arm;

a second arm having a second securing means for releasably fastening the second arm to the bracket, the second securing means disposed on or near a proximal end of the second arm; and a connecting segment connected between distal ends of the first and second arm;

wherein a gap is formed between the connecting segment and the bracket when the article is installed on the bracket, creating a void, wherein the connecting segment is at least semi-transparent to visible light, and wherein the first and second arms include at least one cutout configured to provide clearance for a cross brace of the suspended ceiling.

2. The article of claim 1, wherein the article comprises a diffuser configured to cause the light source to diffuse a predetermined amount of light.

3. The article of claim 1, wherein the securing means comprise a snap-fit groove.

4. The article of claim 1, wherein the securing means comprises magnets.

5. The article of claim 1, wherein the securing means comprises an adhesive strip.

6. The article of claim 5, wherein the adhesive strip comprises a permanent adhesive.

7. The article of claim 5, wherein the adhesive strip comprises a removable adhesive.

8. The article of claim 1, wherein the securing means comprises a hook-and-loop fastener.

9. The article of claim 1, wherein the article comprises a translucent material.

10. The article of claim 1, wherein the article comprises a clear plastic material.

11. The article of claim 1, wherein the connecting segment is a diffuser.

12. The article of claim 11, wherein the bracket is a brace of a suspended ceiling.

13. An article for a light source connectable to a bracket for a suspended ceiling, the article comprising:

a first arm having a first securing means for releasably fastening the first arm to the bracket, the first securing means being on or near a proximal end of the first arm;

a second arm having a second securing means for releasably fastening the second arm to the bracket, the second securing means disposed on or near a proximal end of the second arm; and a connecting segment connected between distal ends of the first and second arm;

wherein a gap is formed between the connecting segment and the bracket when the article is installed on the bracket, wherein the connecting segment is at least semi-transparent to visible light, and wherein the first and second arms include at least one cutout configured to provide clearance for a cross brace of the suspended ceiling.

14. The article of claim 13, wherein the diffuser is configured to cause the light source to diffuse a predetermined amount of light.

15. The article of claim 13, wherein each of the first securing means and the second securing means comprises a snap-fit groove.

16. The article of claim 13, wherein each of the first securing means and the second securing means comprises magnets.

17. The article of claim 13, wherein each of the first securing means and the second securing means comprises an adhesive strip.

18. The article of claim 13, wherein each of the first securing means and the second securing means comprises a hook-and-loop fastener.

* * * * *